Feb. 23, 1937. E. V. CROWELL 2,071,392
APPARATUS FOR CEMENTING WELLS
Filed April 1, 1936
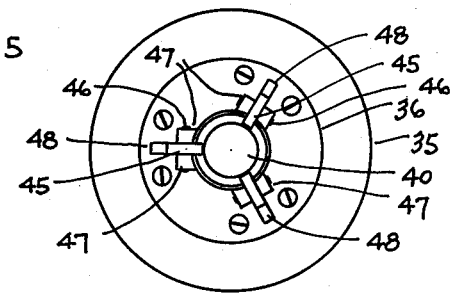
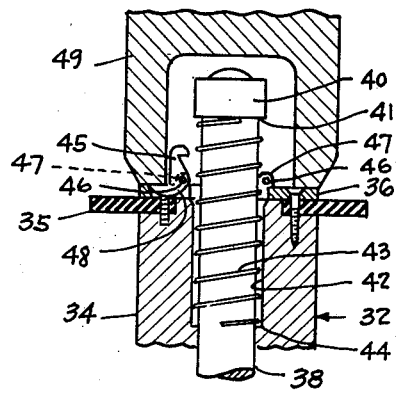
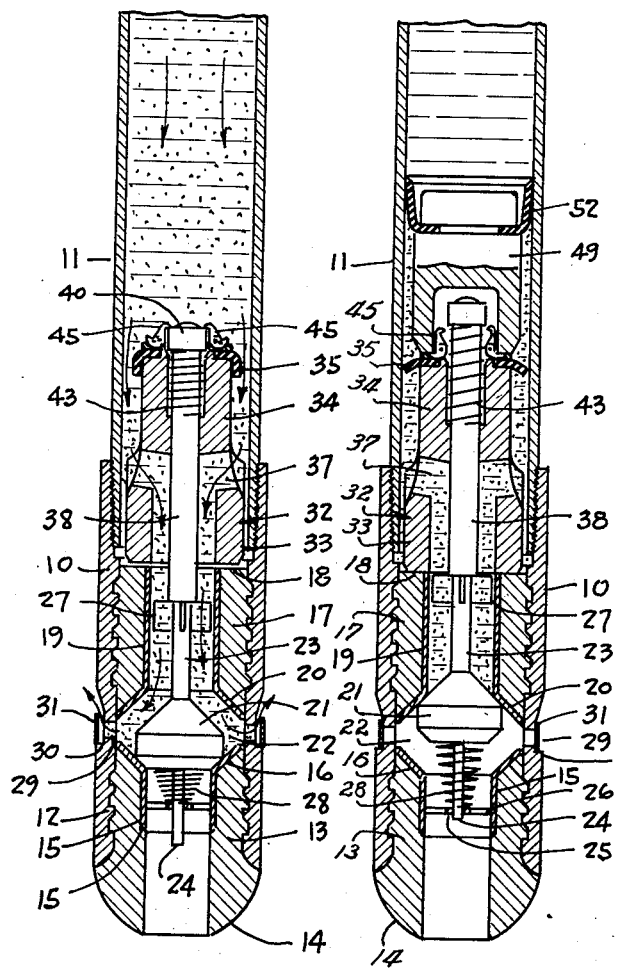
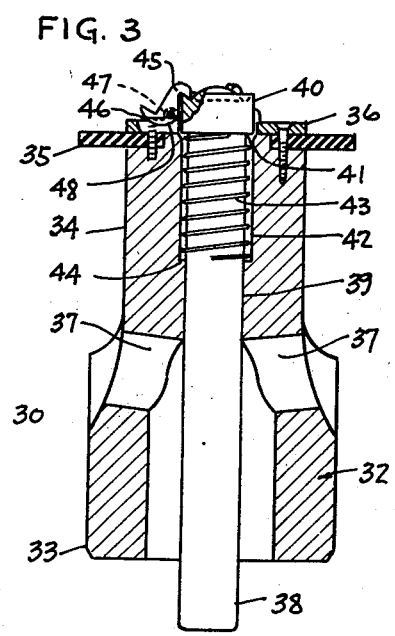
INVENTOR.
Erd V. Crowell
BY Joseph F. Westall
ATTORNEY.

Patented Feb. 23, 1937

2,071,392

UNITED STATES PATENT OFFICE 2,071,392

APPARATUS FOR CEMENTING WELLS

Erd V. Crowell, Los Angeles, Calif.

Application April 1, 1936, Serial No. 72,027

11 Claims. (Cl. 166—1)

This invention relates to apparatus for cementing wells through lateral ports in the casing, and specifically contemplates improvements in the means of my co-pending applications, Serial Numbers 34,920, and 41,400, filed August 8, 1935, and September 20, 1935, respectively.

As is well known in the art to which the present invention appertains, prior to an actual cementing operation of the general character herein contemplated, the casing string must be lowered and landed efficiently, which is usually facilitated by means of a float valve variably mounted within the casing above the cement discharge ports. The cement slurry subsequently pumped through the casing is preferably segregated from pumping fluid by plugs, which at the conclusion of the discharge are adapted to indicate the completion of the operation by closing the bore of the casing which stalls the surface pump. When the cement has set, the plugs and valve structure are drilled out for the advancement of drilling tools, pumping mechanism and the like, through the casing, for the completion of the well. For this reason the structure employed must be adaptable to materials possessing both maximum drillability and strength. Still other factors, such, for example, as the size of the passage for the flow of cement through the casing, lead plug and valve structure, the pressure required to pump cement slurry through obstructions in the bore, and the time required for such passage of the cement to position outside the casing, directly affect the premature lapidification of the cement and constitute problems of major importance to a successful cementing operation.

The problems of the art and the objects relating thereto, described in my above-noted copending applications, are also directly applicable to the present invention.

It is a specific object of the present invention to provide a device comprising a lead plug for the casing which may be lowered by pump pressure from the surface, having a retractable projection at its lower end to displace a float valve resiliently supported in the casing, and which is provided with passages to upwardly by-pass cement slurry to lateral ports, thereby obviating interference of the float valve with the flow of cement to the ports.

Another object is the provision of a follower plug carrying means to release a projection carried on the lower end of a lead plug to permit the projection to be retracted upwardly into the plug.

Still another object is to provide a device whereby a float valve adapted to function above a series of lateral ports in a casing may be positively removed from the passage through the upper bore of the casing to the ports, and subsequently, at the conclusion of the cement discharge, to be returned to its original position to act as a check valve for preventing the return flow of cement into the bore of the casing thereabove.

Other objects and corresponding advantages will be apparent from an examination of the following description of one embodiment of my invention read in the light of the accompanying drawing, in which—

Fig. 1 is a sectional view of the lower part of my invention illustrating the valve structure and lead plug as relatively positioned during the discharge of cement through lateral ports in the casing;

Fig. 2 is a view similar to Fig. 1 contrasting therewith the position of the elements at the conclusion of the cementing operation;

Fig. 3 is an enlarged section of the lead plug as illustrated in Fig. 1;

Fig. 4 is an enlarged fragmentary view depicting the relative operation of the indicator plug and lead plug;

Fig. 5 is a plan view of the upper end of the lead plug.

Referring in detail to the drawing, the numerals of which indicate similar parts throughout the several views, 10 designates a barrel connected in a string of well casing 11. The lower bore of the barrel illustrated and which will be specifically described, is annularly grooved at 12 for the support of a drillable hollow body 13 cast therein so as to extend below the end of barrel 10 and turned inwardly to provide a shoe guide 14 for the casing string 11. A liner 15 for the upper bore of body 13 and conforming to the shape thereof has a bevelled upper edge, comprising a valve seat 16.

An upper valve body 17 is similarly cast in barrel 10 with a bore substantially equal in diameter to the bore through body 13, and having, preferably, a flat upper rim to form a peripheral shoulder 18 in the bore of the barrel, later referred to. An aluminum liner 19 for the bore of the body 17 is downwardly bevelled at its lower end to provide a valve seat 20.

Between valve seats 16 and 20 a valve 21 is provided having bevelled faces corresponding to and adapted to seat on the respective valve seats. To maintain alignment of the valve in the chamber 22 thus formed between seats 16 and 20, valve stems 13 and 24 are secured to the upper and lower sides, respectively, of valve 21 in axial alignment with the casing so as to extend into the respective bores of liners 15 and 19.

The lower stem 24 is slidably supported in a collar 25 of a web 26 integrally formed in the bore of liner 15. Wings 27—27 secured on the upper end of stem 23 contact the walls of liner 19 to prevent tilting of valve 21, and thus insure its efficient operation in completely closing the bore by contact with either seat 16 or 20, depending upon the pressure differential above and below the valve, as will be described. A helical spring 28 encircles stem 24 between the bottom of the valve and web 26 to urge the valve against its upper seat in the absence of other influences.

A series of lateral ports 29—29, preferably bored at an angle to respective diameters of the casing corresponding therewith, through the wall of the barrel between seats 16 and 20, communicate chamber 22 with the bore of the hole in which the string is circulated or cemented. A peripheral groove 30 on barrel 10 in the same horizontal plane as ports 29—29 furnishes protecting flanges for a leaf spring valve 31 which is secured at the side of each port to normally maintain closure thereof for a purpose and in the manner specifically described in my above-mentioned co-pending applications.

From the foregoing description and accompanying drawing it will be apparent that the pressure of mud circulating fluid pumped through the casing string will remove valve 21 from its upper seat 20 without necessarily compelling the valve to close the bore through shoe guide 14. Thus pressure fluid as well as cement may, by overcoming the resilient urge of spring 28 and pressure within the well, circulate through the bottom of the casing, or through lateral ports.

After circulation is definitely established preliminary to cementing, or where circulation is either not desired, or prevented due to the proximity of the formation, through the shoe guide, the bore through the guide is closed and the casing bore above opened to direct communication with the lateral ports 29 by forcing valve 21 to its lower seat.

To most effectively open the upper casing bore to communication with ports 29 a hollow plug 32 having a lower portion comprising its base 33, of a diameter only slightly smaller than that of the casing bore to facilitate centralization of the plug therein, and an upper portion 34 of reduced diameter, is inserted into the casing. A collapsible packing 35 adapted to slidably fit the casing wall, is clamped on the top of plug 32 by an aluminum washer 36 secured to the body of the plug by screws or the like. At the base of the upper portion 34 of the plug 32, holes 37 are drilled into the bore of the base 33 to enable the passage of fluid from above to below the plug. A mandrel 38 of smaller diameter than the bore of base 33 extends through the plug and is held slidably in axial alignment therewith by a diametrically reduced portion 39 of the bore through the plug above holes 37.

At the upper end of mandrel 38 a cap 40 is secured by well known means, forming a downwardly directed shoulder 41. The upper portion 42 of the bore through plug 32, being slightly larger than the mandrel, permits a helical spring 43, encircling the mandrel, to seat on a shoulder 44 thus formed by the reduced bore 39, and expand upwardly against shoulder 41 of cap 40.

Mandrel 38 is held in its lower position, against the tension of spring 43, by a series of latches 45 hinged as at 46 to respective upright feathers 47 integrally formed with washer 36. Latches 45, which hook over the rim of cap 40, may be removed from such engagement by downward pressure against triggers 48 secured as part of each latch, which triggers extend radially outward for actuation by a follower plug 49 about to be described. Mandrel 38 is of sufficient length so as to project below plug 32, and by abutting against the upper end and wings 27 of stem 24, urges valve 21 against its lower seat.

The follower or indicator plug 49 above referred to is inserted in the casing on top of the cement. A flexible calathiform packing member 52 seated on the top of plug 49 slidably contacts the casing wall to receive fluid pressure from above, and thereby drive plug 49 against triggers 48 and lead plug 32 to release the latches 45, whereupon spring 43 will force mandrel 38 upwardly through the bore, relieving pressure on valve stem 23. Valve 21 is then urged against its upper seat by expansive force of spring 28 to again permit it to function as a float valve. The lower end of plug 49 is centrally bored at 50 to permit the annular rim 51 thereof to freely contact triggers 48 and allow upward movement of the mandrel when released from latches 45. Simultaneously with the release of latches 45, plug 32 will drop under the pressure of plug 49 and the fluid thereabove, against shoulder 18 of the upper valve body 17.

The operation of my invention will now be briefly described: Barrel 10 is threaded to the lower end of a section of casing and the string floated or circulated into the hole as assembled. If the float valve is employed to float the string to position for cementing, fluid may then be introduced into the casing and circulation established, as is the well known practice in the art.

The direction of flow of the pressure fluid after displacing valve 21, with respect to its upper seat will then either pass around the valve and through the shoe guide into the bore of the hole or will force valves 31 and flow upwardly around the casing, depending upon a pressure differential at the mouth of the shoe guide and adjacent the casing outside ports 29.

When it has been determined that all detrital material has been removed from around the casing by sufficient circulation, plug 32 is inserted into the casing and is followed by a quantity of cement slurry which is pumped downwardly under sufficient pressure to expel the mud fluid below plug 32 from the casing in the manner above described. On top of the cement, plug 49 is inserted and mud fluid pressure substituted for that of the cement in the pump to force the cement slug between plugs 32 and 49 through the casing to its point of discharge. When plug 32 nears valve body 17, mandrel 38 will contact the upper valve stem 23, forcing the valve to its lower seat. Continued pressure will collapse packer 35 and permit the cement to pass through holes 37 of the plug, into valve chamber 22, and thence force open valves 31 on the ports to be then discharged into the surrounding well bore. Friction of the slurry on packer 35 and lead plug 32 will maintain compression of the spring 28 and valve 21 on seat 16, thus preventing the flow through shoe guide 14. When the upper level of the cement in the casing reaches lead plug 32, follower plug 49 will contact the triggers 48 of their respective latches 45, releasing mandrel 38 from its lower position. Spring 43 will then raise the mandrel and enable the expansion of spring 28 to raise the valve 21 and prevent the return of the cement into the casing either through the ports if there is any leakage of valves 31, or through shoe guide 14. As an added precaution against any displacement of the cement while setting, a tight head may be held on the casing to equalize pressures adjacent the valve.

It will thus be seen that I have provided a device for cementing wells embodying means for initially floating a casing in a well bore, which will permit circulation of mud fluid or cement either through the bottom of the casing or through lateral ports. A passage through the valve structure of maximum width for the cement flow is maintained with a consequent minimum of friction by the spring actuated float valve.

While the barrel 10 has been shown as being particularly adaptable for use as a shoe, it will be understood that my invention is by no means limited to use at the bottom of a casing string, as it is believed clear that the subject-matter of my device may be employed at any point intermediate the ends thereof, either in a collar or in a section of casing; that any well known latching mechanism may be substituted for that shown; and that numerous changes may be made in design, size, proportion and relative arrangement of the various parts without departing from the spirit of my invention as defined in the appended claims.

What I claim and desire to cover by Letters Patent is:

1. A ported well casing, a pair of annular valve seats in said casing, a valve disposed between said seats, a lead plug actuated by fluid pressure carrying means to urge said valve against said lower seat, and a second plug actuated by fluid pressure to release said valve from pressure of the means carried by said lead plug.

2. In a ported well casing, a float valve adapted to close the bore of the casing above the port, means actuated by fluid pressure to compel said valve to close the bore below the port to pressure thereabove, and means actuated by fluid pressure to relieve pressure of said first-mentioned means on said float valve.

3. In an apparatus for cementing wells, a plug having a retractable projection at its lower end, means to releasably maintain said projection in its extended position with respect to said plug, and a second plug adapted to release said means to permit said projection to retract upwardly by pressure thereagainst.

4. In an apparatus for cementing wells, a plug having a mandrel slidable therewith, means to releasably maintain the lower end of the mandrel in advance of the plug, a second plug actuated by fluid pressure to release said means and permit the mandrel to slide upwardly with respect to said first plug, and resilient means to urge said mandrel upwardly upon its release.

5. In a well casing, a float valve adapted to close the bore therein, a plug actuated by fluid pressure having a retractable mandrel extending therebelow, mechanism to releasably maintain said mandrel in extended position with respect to said plug to permit the downward movement of said plug to cause the mandrel to open said valve, and a second plug carrying means to release said mechanism and thereby relieve pressure of said mandrel on said valve.

6. Well casing having a series of lateral ports, valvular means normally closing said ports but adapted to open to pressure within the casing, means in the casing and immovable with relation thereto above and below said ports, forming, respectively, upper and lower valve seats, a float valve between said seats, means normally resiliently supporting said float valve against said upper seat, a lead plug adapted to be driven through the well casing by pressure fluid to contact and urge said float valve to its lower seat while said pressure fluid by-passes said plug downwardly within the casing, and a second plug to relieve pressure of said lead plug on said float valve.

7. Well casing having a series of lateral ports, means in the casing and immovable with relation thereto above and below said ports, forming, respectively, upper and lower valve seats, a float valve between said seats, means normally resiliently supporting said float valve against said upper seat, a lead plug adapted to be driven through the well casing by pressure fluid to engage and urge said float valve to its lower seat while said pressure fluid by-passes said plug downwardly within the casing, and a second plug adapted to discontinue the flow of said pressure fluid downwardly past the first mentioned plug and to release said valve from pressure of said lead plug.

8. In a ported well casing, a float valve to close the bore of said casing above the port, a shoulder within the casing above said valve, a lead plug actuated by fluid pressure having a mandrel slidable therewith, means to releasably maintain said mandrel in advance of said plug to permit downward movement of said plug to cause the mandrel to open said valve, a second plug actuated by fluid pressure to release the mandrel for upward movement and impel said lead plug against said shoulder to prevent further downward movement of either of said plugs, and means carried by said second plug to close the bore of the casing to pressure thereabove and thereby prevent further downward pressure against said valve.

9. In a device of the character described, a well casing, a valve in said casing, a plug actuated by fluid pressure to compel said valve to move in advance thereof, and means actuated by fluid pressure to relieve pressure of said plug on said valve.

10. In a device of the character described, a well casing, a valve in said casing, means actuated by fluid pressure to compel said valve to move in advance of said means, and means actuated by fluid pressure to coact with said first-mentioned means to relieve pressure on said valve.

11. In a ported well casing, a passage from the upper end of the casing to the port, a valve normally closing said passage to pressure within the casing at the port, a plug to displace said valve to communicate the upper end of the casing with the port, and means actuated by fluid pressure to relieve pressure of said plug on said valve.

ERD V. CROWELL.